(12) United States Patent
Wright

(10) Patent No.: US 11,358,580 B2
(45) Date of Patent: Jun. 14, 2022

(54) SYSTEM FOR TRAIN TERMINAL TEST

(71) Applicant: NEW YORK AIR BRAKE, LLC, Watertown, NY (US)

(72) Inventor: Eric C. Wright, Evans Mills, NY (US)

(73) Assignee: NEW YORK AIR BRAKE, LLC, Watertown, NY (US)

( * ) Notice: Subject to any disclaimer, the term of this patent is extended or adjusted under 35 U.S.C. 154(b) by 198 days.

(21) Appl. No.: 16/717,280

(22) Filed: Dec. 17, 2019

(65) Prior Publication Data
US 2021/0179054 A1    Jun. 17, 2021

(51) Int. Cl.
| | |
|---|---|
| *B60T 17/22* | (2006.01) |
| *B61H 13/34* | (2006.01) |
| *B61H 13/00* | (2006.01) |
| *H04B 1/3827* | (2015.01) |
| *H04L 67/12* | (2022.01) |

(52) U.S. Cl.
CPC .......... *B60T 17/228* (2013.01); *B60T 17/221* (2013.01); *B61H 13/34* (2013.01); *B61H 13/00* (2013.01); *H04B 1/3833* (2013.01); *H04L 67/12* (2013.01)

(58) Field of Classification Search
CPC ..... B60T 17/228; B60T 17/221; B61H 13/00; B61H 13/34; H04B 1/3833; H04L 67/12
See application file for complete search history.

(56) References Cited

U.S. PATENT DOCUMENTS

| | | | | |
|---|---|---|---|---|
| 6,094,977 | A * | 8/2000 | Vaughn | G01M 3/26 73/121 |
| 6,098,006 | A * | 8/2000 | Sherwood | B60T 13/665 303/128 |
| 6,435,623 | B1 * | 8/2002 | Peltz | B60T 13/665 303/15 |
| 7,647,816 | B2 * | 1/2010 | Vaughn | G01M 17/08 73/39 |
| 9,283,945 | B1 * | 3/2016 | Kernwein | B60T 17/228 |
| 2006/0048566 | A1 * | 3/2006 | Hawthorne | B60T 17/228 73/121 |

* cited by examiner

*Primary Examiner* — Pamela Rodriguez
(74) *Attorney, Agent, or Firm* — Bond Schoeneck and King PLLC; David Nocilly

(57) ABSTRACT

A system for identifying whether the braking system of a train is functioning properly such as during a train terminal test. A monitor on a rail car is used to detect abnormalities in the braking system and can report problems to a handheld terminal or a central controller in the locomotive. The monitor has a pressure sensor for measuring brake pipe pressure, auxiliary reservoir pressure, emergency reservoir pressure, and brake cylinder pressure at the rail car. The monitor also has a controller that can calculate whether brake pipe reduction resulted in the appropriate amount of brake cylinder pressure. The monitor can then provide the results locally via a visual indicator or remotely to a handheld terminal used by a train inspector or the controller in the locomotive. Testing data over time may be stored for future reference or transmitted remotely to assist with maintenance and service scheduling.

15 Claims, 7 Drawing Sheets

SYSTEM FOR TRAIN TERMINAL TEST

BACKGROUND OF THE INVENTION

1. Field of the Invention

The present invention relates to train terminal testing and, more specifically, to a system for identifying and distinguishing between rail cars with properly functioning brake components and rail cars with brake system defects.

2. Description of the Related Art

Governmental or regulatory organizations regularly establish testing procedures to ensure that a train is fully functional and the braking system is adequate before the train is placed into service. For example, in the United States, the Federal Railroad Administration requires an initial terminal test (49 C.FR. § 232.205) for a train that involves, among other things, a braking system leakage test and a physical and pneumatic inspection of the braking system of the train. The leakage test involves charging the air brake system to the pressure at which the train will be operated and checking whether the pressure at the last car, as measured at the end-of-train (EOT), is within 15 psi of the charge pressure, but not less than 75 psi. The leakage test also involves making a 20 psi brake pipe service reduction, cutting out the brake pipe maintaining at the controlling locomotive, waiting 45-60 seconds, and then measuring the brake pipe leakage to ensure that leakage does not exceed 5 psi/min. Alternatively, the test can involve making a 20 psi brake pipe service reduction, not cutting out the brake pipe maintaining at the controlling locomotive, and measuring the air flow into the brake pipe by the locomotive air flow meter to ensure that air flow does not exceed 60 CFM.

The physical inspection involves charging the air brake system to the pressure at which the train will be operated and then inspecting to determine that all angle cocks and cutout cocks are properly positioned and that all air hoses are properly coupled and not kinked, bound, or fouled, or be in any other condition that restricts air flow. An examination must also be made for leaks and necessary repairs made to reduce leakage to the required minimum and any retaining valves are inspected to ensure they are in proper condition for service. The pneumatic inspection involves making a 20 psi brake pipe service reduction and checking to determine whether the brakes on each car have applied in response to the 20 psi brake pipe service reduction and remain applied until a release of the air brakes has been initiated by the controlling locomotive. The inspection further involves an examination of the functioning of all moving parts of the brake system on each car from both sides of the car. For cars equipped with 8.5 or 10-inch diameter brake cylinders, piston travel shall be within a predetermined amount, i.e., 7 to 9 inches. For cars not equipped with 8.5 or 10-inch diameter brake cylinders, brake piston travel shall be within the piston travel stenciled on the car. Importantly, any car having brake components found to be not functioning must either be removed from the train or repaired before that train may enter service.

Terminal tests are clearly burdensome, time consuming, and error-prone, as multiple components must be manually inspected on each car of a train in both the brakes applied and brakes released state. Many components are difficult to see and the test and inspection only provides a gross indication of brake system fitness on each car. For example, observing that the shoe is against the wheel during the brake application provides no indication of the actual brake force; the actual amount of force could range from nearly zero to significant over-braking depending on the nature of the car system brake fault. As most of the cars in a train, which can be over one hundred, will have properly functioning brake systems and components, the inspection involves trying to identify a small number of defects within a large sample of acceptable performing items. Due to the nature of manual (human) inspection, the required inspection is likely to result in poor inspection quality, particular since train inspections may have to take place in darkness and during severely inclement weather conditions. Accordingly, there is a need in the art from a system that can assist in the identification of which cars have properly functioning brake device components and which cars have brake system defects.

BRIEF SUMMARY OF THE INVENTION

The present invention is a system that can help identify whether the braking system of a train is functioning properly during a train terminal or other test. In a first embodiment, the present invention comprises a monitor for installation on a rail car that can detect abnormalities in the braking system during the terminal test. The monitor includes a pressure sensor in communication with a source of brake pipe pressure, a source of auxiliary reservoir pressure, a source of emergency reservoir pressure and a source of brake cylinder pressure. The monitor also has a controller interconnected to the pressure sensor and configured to calculate whether a reduction of pressure at the source of brake pipe pressure is accompanied by an acceptable change in pressure at the source of brake cylinder pressure. An indicator may be coupled to the monitor so that the controller can provide an indication to a user whether the reduction of pressure at the source of brake pipe pressure was accompanied by the acceptable change in pressure at the source of brake cylinder pressure. The monitor may include a communication interface interconnected to the controller so that the controller can output an indication of whether the reduction of pressure at the source of brake pipe pressure was accompanied by the acceptable change in pressure at the source of brake cylinder pressure via the communication interface. The indication may comprise a signal sent to a remote device interconnected to the communication interface. The remote device may comprise a handheld terminal interconnected to the communication interface by a wireless connection.

In a further embodiment, the monitor may be in communication with a control and communication device located in the cab of a locomotive and in communication with the controller. The control and communication device may be configured to initiate the terminal test. More specifically, the control and communication device may command a computer controlled brake of the locomotive to charge a brake pipe that is also the source of brake pipe pressure at the rail car with pressure and then to release a predetermined amount of pressure from the brake pipe to cause the reduction of pressure at the source of brake pipe pressure at the rail car. The controller may then communicate whether the reduction of pressure at the source of brake pipe pressure is accompanied by the acceptable change in pressure at the source of brake cylinder pressure to the control and communication device. The control and communication device may provide a visual indication on a driver display of the locomotive whether the reduction of pressure at the source of brake pipe pressure is accompanied by the acceptable change in pressure at the source of brake cylinder pressure to the control and communication device. The control and communication device may also be interconnected to a communication interface and programmed to output via the communication interface the indication of whether the reduction of pressure at the source of brake pipe pressure was accompanied by the acceptable change in pressure at the source of brake cylinder pressure via the communication interface. A handheld terminal may be interconnected to the communication interface by a wireless connection for receiving the indication of whether the reduction of pressure at the source of brake pipe pressure was accompanied by the acceptable change in pressure at the source of brake cylinder pressure via the communication interface.

The present invention also includes a method of monitoring a rail car braking system. In a first step, a monitor is provided on a rail car. The monitor comprises a pressure sensor in communication with a source of brake pipe pressure, a source of auxiliary reservoir pressure, a source of emergency reservoir pressure and a source of brake cylinder pressure and a controller interconnected to the pressure sensor and configured to calculate whether a reduction of pressure at the source of brake pipe pressure is accompanied by an acceptable change in pressure at the source of brake cylinder pressure. The pressure in a brake pipe may then be released to cause the reduction of pressure at the source of brake pipe pressure at the rail car. The monitor may then calculate whether the reduction of pressure at the source of brake pipe pressure was accompanied by an acceptable change in pressure at the source of brake cylinder pressure of the rail car. The monitor may further indicate whether the reduction of pressure at the source of brake pipe pressure was accompanied by the acceptable change in pressure at the source of brake cylinder pressure at the rail car. The step of indicating whether the reduction of pressure at the source of brake pipe pressure is accompanied by the acceptable change in pressure at the source of brake cylinder pressure may comprise sending a signal via a communication interface. The method may also include the step of receiving the signal with a control and communication device located in the cab of a locomotive that is coupled to the rail car. The method may additionally include the step of receiving the signal with a handheld terminal.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
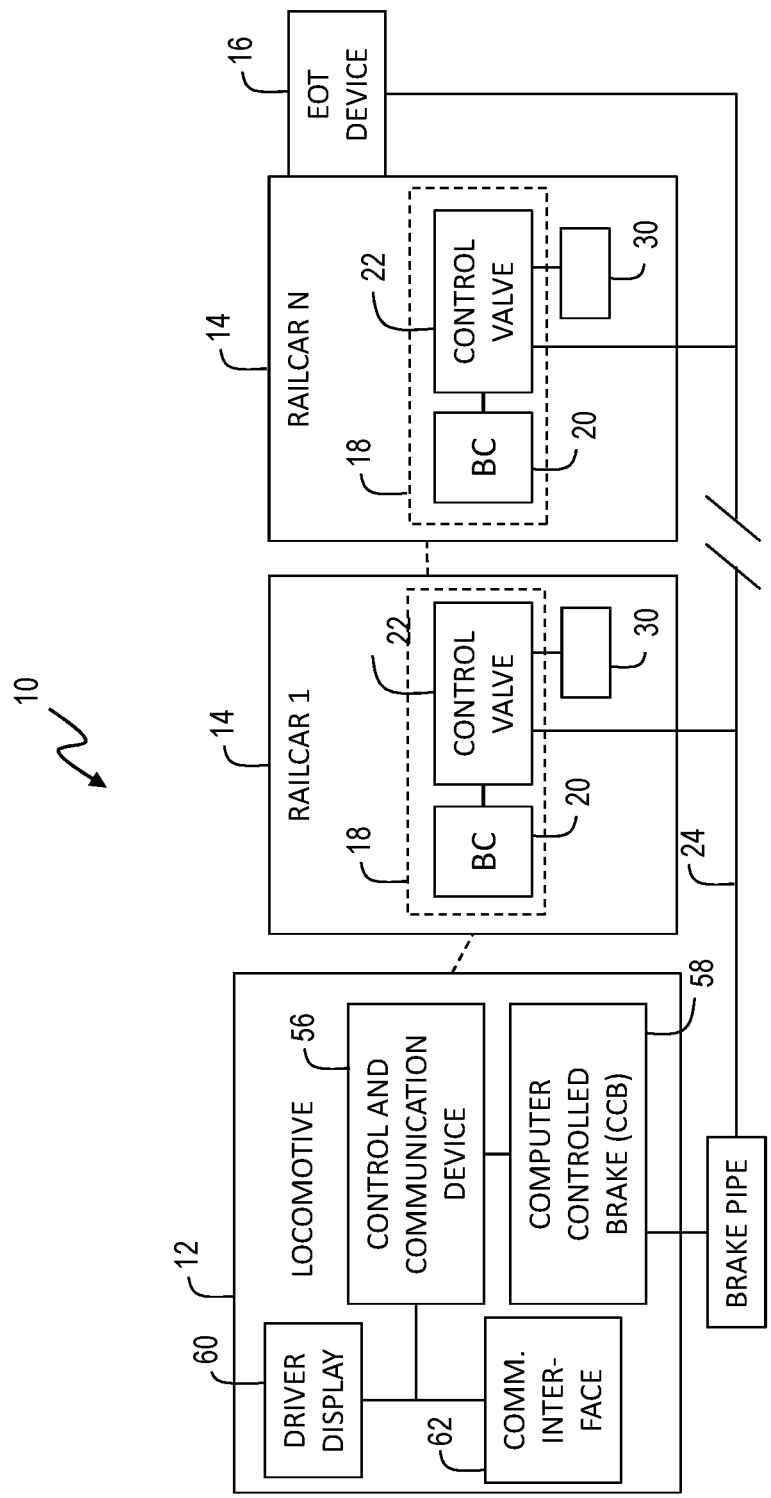
FIG. 1 is a schematic of a train having a terminal test system according to the present invention.

Referring to the figures, wherein like numeral refer to like parts throughout, there is seen in FIG. 1 a train 10 having one or more locomotives 12, a number of rail cars 14, and an End of Train (EOT) device 16 positioned on the last car 14 of the train 10. Each car 14 on train 10 may be equipped with a brake system 18 conforming to Association of American Railroads (AAR), International Union of Railways (UIC), Euro-Asian (GOST), or other recognized brake system standards. Brake system 18 includes a brake cylinder (BC) 20 and control valve 22 that is coupled to a brake pipe 24 which runs the length of train 10.

Figure 2:
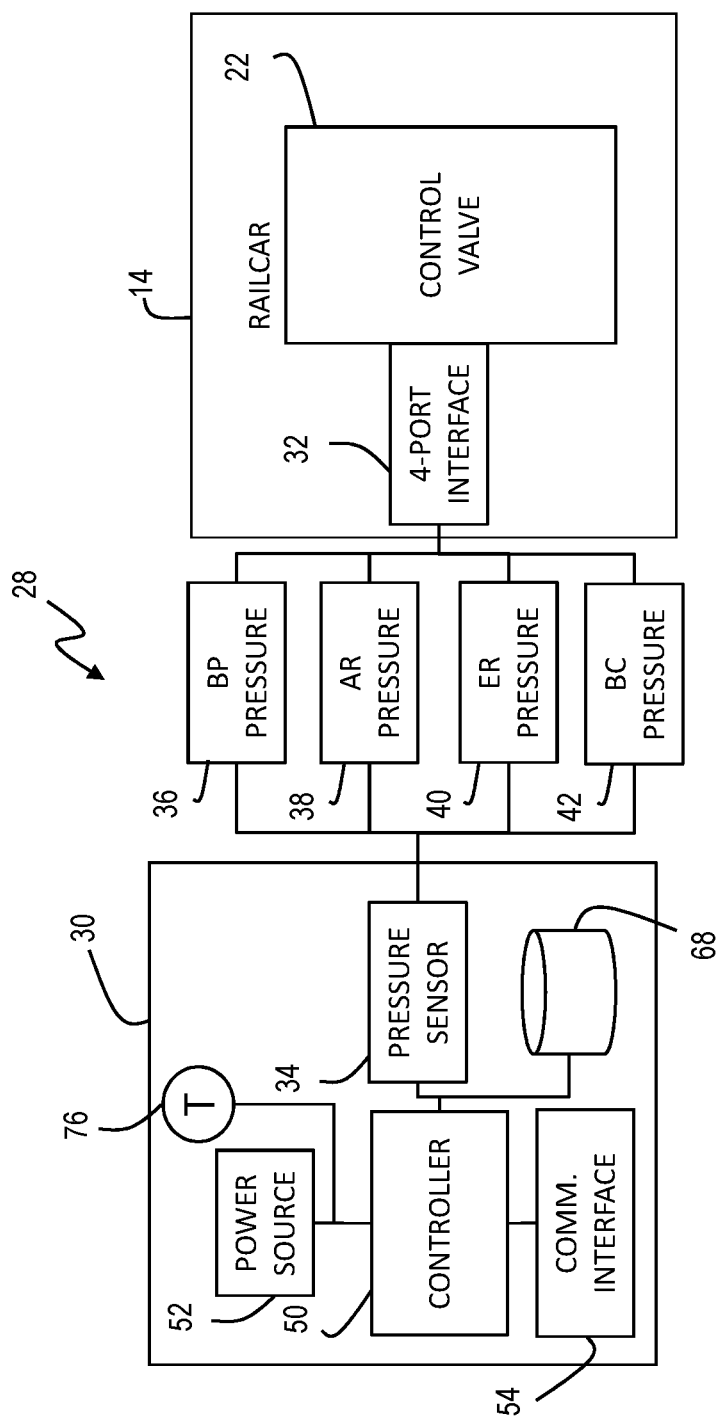
FIG. 2 is a schematic of a brake performance sensor device for a terminal test system according to the present invention.

Referring to FIG. 2, the present invention comprises a testing system 28 that may be used to more readily identify which cars have properly functioning brake components and which cars have brake system defects. System 28 includes a physical brake performance sensor device (BPSM) 30 that can be located in each car 14 of train 10. Preferably, BPSM 30 is interconnected to the 4-port test interface 32 of control valve 22 for easy access to braking system 18. BPSM 30 includes a pressure sensor 34 that is interconnected to a source of BP pressure 36, a source of auxiliary reservoir (AR) pressure 38, a source of emergency reservoir (ER) pressure 40, and a source of BC pressure 42, all of which are available via 4-port test interface 32. Pressure sensor 34 is configured to determine the pressure associated with each of the source of BP pressure 36, the source of AR pressure 38, the source of ER pressure 40, and the source of BC pressure 42. BPSM 30 further includes a programmable microcontroller 50, power source 52, such as a battery, and a communication interface 54 that allows BPSM 30 to communication pressures determined by pressure sensor 34. For example, communication interface 54 could comprise a radiofrequency identification (RFID) transceiver, a wireless interface such as a Bluetooth® transmitter, or a wired communication bus such as an ECP trainline connector, or a light emitted diode (LED) indicator. In addition, BPSM 30 may optionally include an ambient temperature sensor 76 to record the temperature associated with a car failure. The ambient temperature could be important, for example, if the brake cylinder leakage exceeds a predetermined rate, such as 1 psi per minute, during a terminal test at −20° F., but does not exceed the predetermined rate when tested at 70° F. in a repair shop.

Although testing system 28 could be implemented strictly on individual cars 14 that report externally via communication interface 54, system 28 may include a control and communication device 56 positioned in locomotive 12 that can communication with each car 14 via a locomotive communication interface 54. Control and communication device 56 comprises programmable hardware that is configured to communication with each BPSM 30 and the brake controls of train 10. For example, control and communication device 56 may be integrated into the computer controlled brake (CCB) 58 of locomotive 12 via software or provided as a stand-alone hardware unit that is coupled to CCB 58. Alternatively, control and communication device 56 may be integrated into or in communication with a train control system, such as LEADER® available from New York Air Brake of Watertown, N.Y., that includes hardware that can be programmed to provide the functions of control and communication device 56.

Control and communication device 56 may be configured to command CCB 58 to perform a terminal test such as triggering CCB 58 to charge and release pressure in brake pipe 24 according to the particular regulations for the terminal test. For example, control and communication device 56 may be programmed with the appropriate terminal test protocol required by the local jurisdiction. Once a terminal test is triggered, testing system 28 may read the brake pipe air flow and BP pressure at locomotive 12, the brake pipe pressure at the last car from EOT device 16, and the pressure measurements performed by BPSM 30. System 28 may then report on the results so that control and communication device 56 can display a pass/fail indication on a driver display 60.

Figure 3:
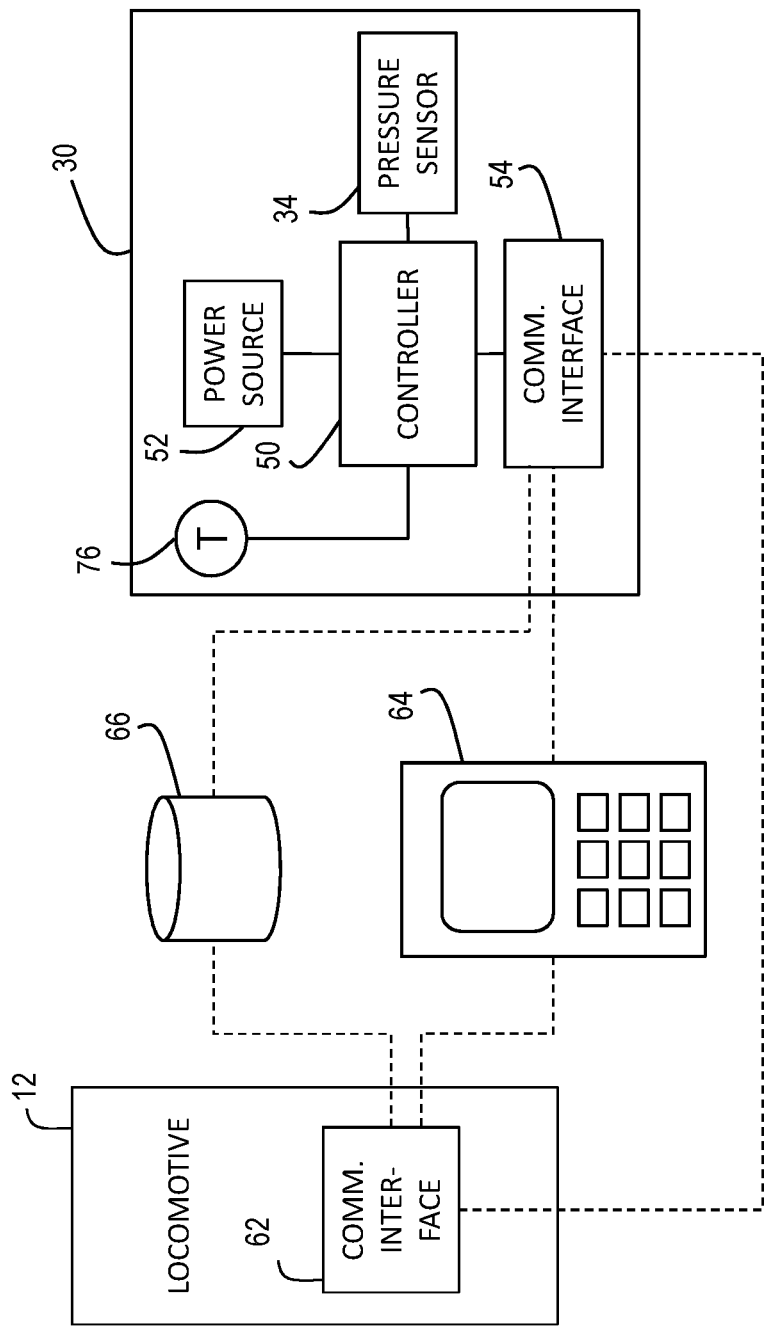
FIG. 3 is a schematic of a brake performance sensor device coupled to a handheld terminal according to the present invention.

Referring to FIG. 3, communication interface 54 may be configured for sending data to and receiving data from a handheld terminal 64 or other device in use by a train inspector, or even with a remote server 66. As explained herein, handheld terminal 64 may be programmed to work in conjunction with and/or perform some of the functions of system 28. Remote server 66 may be used for downloading of terminal test protocols, uploading current testing data, downloading maintenance records, and uploading prior performance data. It should be recognized that the connection to remote server 66 may also be provided via control and communication device 56 and communication interface 62 of locomotive 12 to centralize communication and avoid the need for each car 14 to include a BPSM 30 that is equipped to communication with external hosts. Thus, testing system 28 could be configured to provide for external communications from BPSM 30, from control and communication device 56, or from either (or both), as desired. Current and historical testing data may be used by remote server 66 to initiate maintenance on defective equipment or schedule maintenance for equipment that has passed the testing protocol but is at risk for a future failure. Remote server 66 may thus be used to provide rail car failure data to a rail car repair shop (via work order or bad order report via a back office system) to facilitate repairs. Access to the historical data via the back office system associated with remote server 66 is also a mechanism for identifying the rails cars that are most likely causing a train defect.

Figure 4:
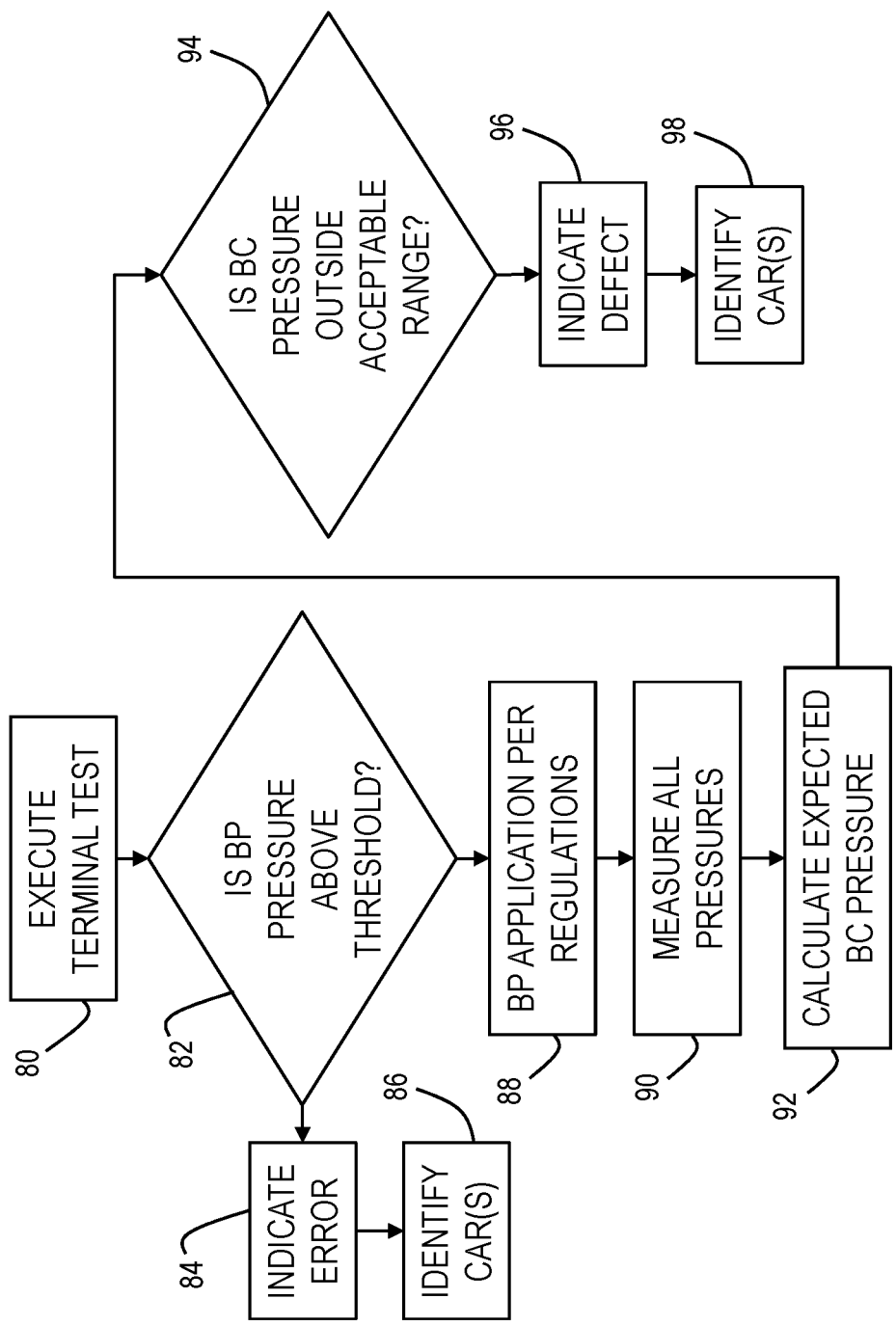
FIG. 4 is a flowchart of a method of monitoring a rail car braking system according to the present invention.

Referring to FIG. 4, a terminal test 80 may be executed by system 28. Upon execution, a check 82 is made by BPSM 30 associated with each car 14 to determine if the BP pressure at that car 14 is greater than the pressure amount required by the particular terminal test, e.g., 75 psi, and is therefore acceptable, i.e., it satisfies the particular threshold required by the particular test or the applicable regulations governing operation of the train. If the BP pressure is less than the required threshold, an error should be indicated 84. The cause of the error may be that the train leakage is too great or that the train may not be fully recharged and the test not valid. In addition, if the pressure is low in the end of the train, then there may be a closed ball cock or kinked hose at that location. As a result, error indication 84 could include an identification of the car(s) 14 having an error 86, either by illumination of a local light or display, or communication of car ID numbers by communication interface 54 directly to handheld terminal 64 or to driver display 60 via control and communication device 56.

After check 82, a terminal test brake pipe application 88 may be made, e.g., a 20 psi reduction under AAR regulations. BPSM 30 can then measure all of the pressures to be monitored 90, i.e., BP pressure 36, AR pressure 38, ER pressure 40, and BC pressure 42. BPSM 30 can also calculate the expected BC pressure 92 based on the measured BP pressure, the AR pressure, the known auxiliary reservoir volume (e.g., 2500 in$^3$), the expected brake cylinder Volume (e.g., 1000 in$^3$) at nominal piston stroke. A check 94 is performed to determine whether BC pressure is outside of an acceptable range, as described below. If so, a defect is indicated 96. The defect may include a defective or misadjusted slack adjuster, bound or broken rigging, or a defective control valve. As a result, defect indication 96 could include an identification of the car(s) 14 having a defect 98.

Using Boyles Law, the expected BC pressure can be calculated as $(P_{emer}-P_{BP})/(Vol_{aux})/(Expected\ Vol_{BC})$ or, in the present example, (BP reduction)(2500)/1000. ER pressure may be used as a proxy for the initial BP charge pressure in the brake pipe reduction calculation. For a 20 psi reduction in the exemplary configuration, the expected BC pressure is 50 psi. If the BC piston stroke was 7.5 inches, then the expected BC pressure would be 53 psi. If the BC piston stroke was 9 inches, then the expected BC pressure would be 47 psi. Thus, for a 20 psi brake pipe reduction, the acceptable range of BC pressures is 47 psi to 53 psi.

Because BPSM 30 can calculate the actual BP reduction from measured values, the resulting BP pressure calculation can be automatically corrected for an actual BP reduction, i.e., if the actual BP reduction was 21 psi, then the acceptable range of BC pressures would be calculated correspondingly. For cars with brake cylinders other than those having an 8.5 inch or 10 inch diameter, the overall brake cylinder volume may be adjusted to be approximately 1000 in$^3$ so that the equalization pressures are the same. As a consequence, this approach of system 28 may be used on all cars having brakes conforming to AAR standards (or another comparable standard).

The use of system 28 provides the additional advantage that the BC pressure 42 is measured upstream of any empty/load device. As an example, an AAR empty/load device typically includes an empty/load sensor to determine the loaded status of car 14 and a proportional valve and associated volume which reduces the actual brake cylinder pressure for an empty car 14. For example, a 40% E/L system would have an empty-car brake pressure 40% of a loaded car brake pressure for the same brake pipe reduction. Thus, for a 20 psi BP reduction, an empty car would have a BC pressure of approximately 0.4*50 psi=20 psi. At this BC pressure 42, the BC piston stroke may be less than the required 7 inches, due to reduced deflection of the brake rigging at the lower pressure. This same car might be fully compliant to the 7 inch to 9 inch piston stroke requirement if tested in the loaded state. Significantly, the control pressure (3-pipe) to the empty/load device is always representative of the loaded car pressure. By measuring the brake cylinder equalization pressure at the 3-pipe upstream of the Empty/Load device, the measurement of system 28 provides the advantage that it is independent of the empty or load condition of car 14.

BPSM 30 can additionally monitor BC pressure 42 during the terminal test and flag any car which has a BC pressure 42 leakage rate higher than the allowed amount, e.g., 1 psi per minute. This approach provides additional test coverage not possible with a manually observed terminal test. A monitoring procedure of system 28 may therefore include applying the 20 psi brake application, waiting one minute (or other specified time) for the BC pressure to stabilize, measuring the BC pressure 42, waiting a specified time (such as five minutes) and then reading the BC pressure and calculating the BC leakage rate (PSI/min) as $(BC_1-BC_2)/5$. As an example, a BC pressure leakage rate less than or equal to 1 psi per minute may be deemed acceptable and a BC pressure leakage rate greater than 1 psi per minute deemed not acceptable and used to generate a flag to a terminal test inspector. While some cars may be equipped with a brake cylinder maintaining function (BCM), BCM has a known hysteresis and will maintain BC pressure at a somewhat reduced value from the target value. Leakage may be measured during the time between the initial BC pressure 42 charging and until the BC pressure 42 is stabilized at the new lower value. When the brakes are released, BPSM 30 can monitor BP pressure to detect the release, monitor AR pressure recharge (to BP/EMR pressure) to verify recharge functionality of control valve 22, and can monitor BC pressure (to 0 psi) to also verify control valve function.

During an initial brake pipe leakage test, BPSM 30 may be configured to facilitate locating of the leaks in brake pipe if the BP pressure leakage is found to be excessive. With brake pipe maintaining at the cut-in of the controlling locomotive 12, an inspector may traverse the length of the train to look for the source of the leak. BPSM 30 may sequentially transmit BP pressure 36 of each car System 28 may also include a historical data function to assist an inspector in finding cars 14 which are likely to have high leakage or defects. Every car 14 generally has a service record in a database (for AAR it is the UMLER), which may include the date and results of the last test of car 14 (AAR S486 single car test). The service record for each car 14 will also include brake system maintenance tasks and dates and the accompanying car mileage. System 28 may be programmed to obtain the IDs of all cars 14 in train 10 from a train manifest, a handheld terminal 64, RFID tags associated with car 14, or from BPSM 30 of each car 14. For example, the unique car IDs may be entered into BPSM 30 at the time of installation. If a terminal test detects a high leakage rate, for example, system 28 may query the service record of each car 14 in train 10, and prioritize checking of those cars 14 with the oldest brake equipment, previous marginal test results, and/or highest mileage. System 28 may display, such as for the inspector to view on handheld data terminal 64, a list of car IDs and the location of each associated car 14 along train 10 that are most likely to be the source of the excessive brake pipe leakage.

In the example of system 28 using RFID or wireless communication, a train inspector may utilize handheld terminal 64 to query and view the brake status of each car 14. It should be recognized that handheld terminal 64 may comprise a smart device such as a smart phone tablet. As a train inspector traverses the length of the train, handheld terminal 64 establishes a communication link to the most proximately positioned car 14. BPSM 30 may then be queries to transmit basic status information, such as a simple good/bad indication via a color coded display, or more detailed information, such as BP pressure 36, AR pressure 38, ER pressure 40, and BC pressure 42. Alternatively, BPSM 30 can automatically transmit data to handheld terminal 64 once a link is established. If the pressures are transmitted to handheld terminal 64, the fitness calculations described above may be programmed into handheld terminal 64 rather than directly in BPSM 30, thereby alleviating the need for BPSM 30 to have the programming or use power to perform the calculations. In addition, partitioning system 28 across BPSM 30 and handheld terminal 64 simplifies software management, as updates or changes are only necessary to handheld terminal 64 rather than every BPSM 30 of every car 14 outfitted according to the present invention.

System 28 may be configured to so that BPSM 30 operates automatically whenever it detects a threshold BP pressure reduction indicating a brake application, e.g., 20 psi. BPSM 30 of each car 14 can then perform a fitness calculation and display a good/bad indication with a red/green LED or other visual indicator. As a train inspector traverses the length of the train, brake status may be ascertained simply by observing the indicator on each car.

BPSM 30 may include a database 68 of prior test data for car 14 by logging the key data such as brake cylinder leakage rate, BP leakage rate, and related data over time. BPSM 30 or handheld terminal 64 may query database 68 for this historical data to identify whether car 14 has degrading performance and, if so, flag car 14 as having a higher probability of being the source of a train defect. BPSM 30 may further be programmed to flag car 14 determining to have degraded performance for scheduling of maintenance.

BPSM 30 may establish a communication link with communication interface 62 of control and communication device 56 in locomotive 12. BPSM 30 may report the good/bad indication, or more detailed information, such as BP pressure 36, AR pressure 38, ER pressure 40, and BC pressure 42, on driver display 60. It should be recognized the calculations discussed above may therefore take place in any of BPSM 30, handheld terminal 64, or control and communication device 56 in locomotive 12, or combinations thereof. In addition, the calculations and display of results may be triggered by a query, or system 28 may be configured to automatically report results any time a terminal test is performed.

Although BPSM 30 is optimally provided in every car 14, it is possible that every car 14 may not be so equipped. System 28 will still assist a train inspector in identifying braking system test failure and locating the cause of such failures if one some cars 14 in train 10 are equipped with BPSM 30. Cars 14 with BPSM 30 may still provide car status information as described above to reduce manual inspection time, with cars 14 without BPSM 30 inspected manually.

Figure 5:
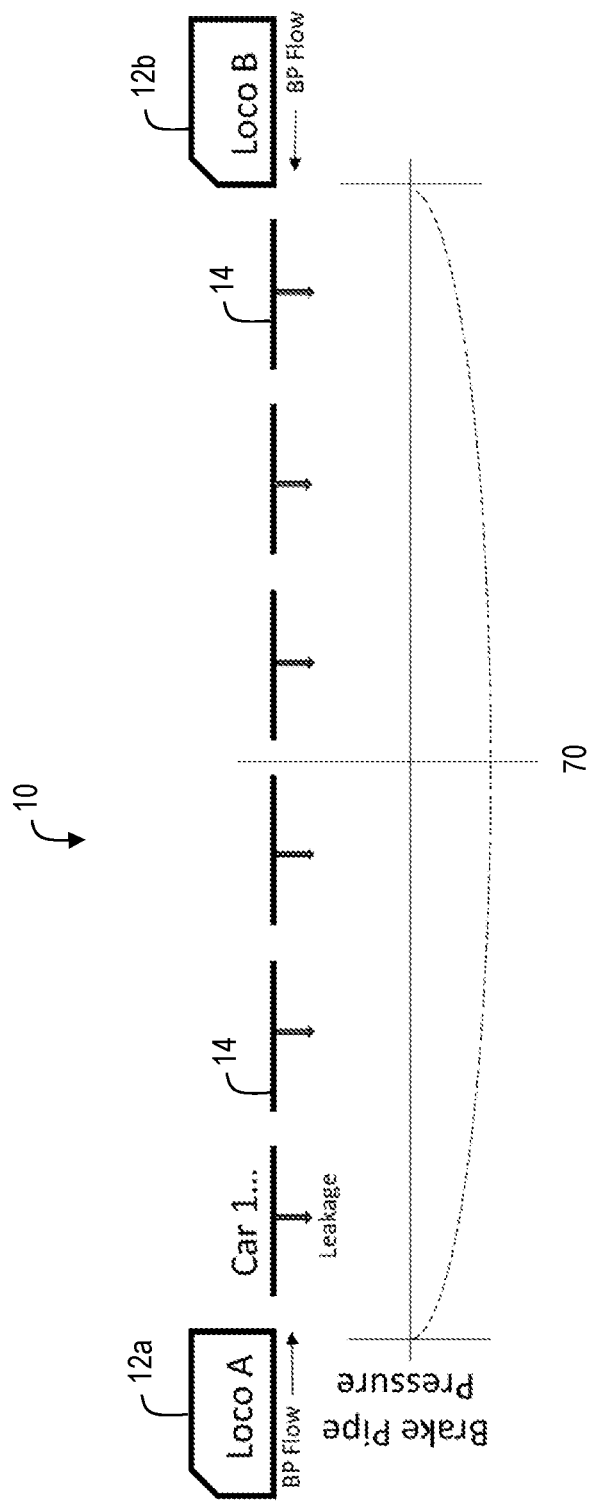
FIG. 5 is schematic showing a train with distributed power that includes a system according to the present invention adapted to determine the source of leakage.
Figure 6:
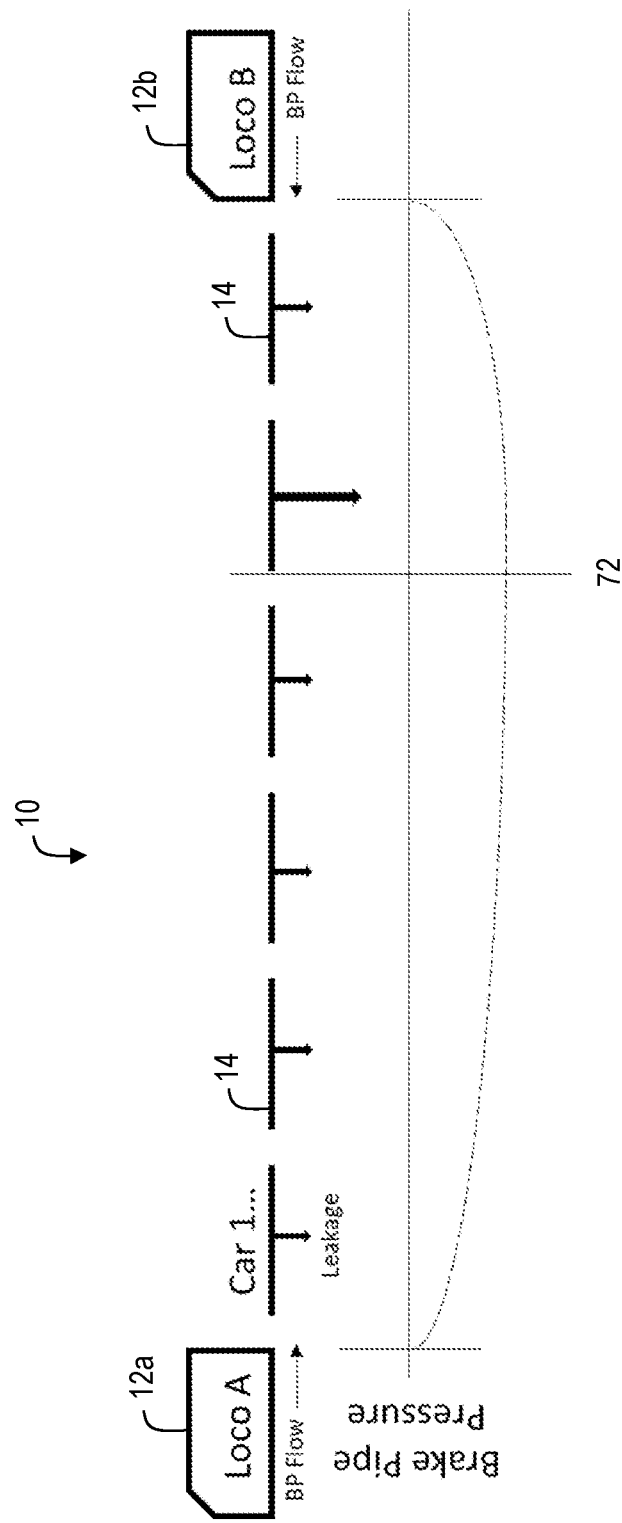
FIG. 6 is another schematic showing a train with distributed power that includes a system according to the present invention adapted to determine the source of leakage.
Figure 7:
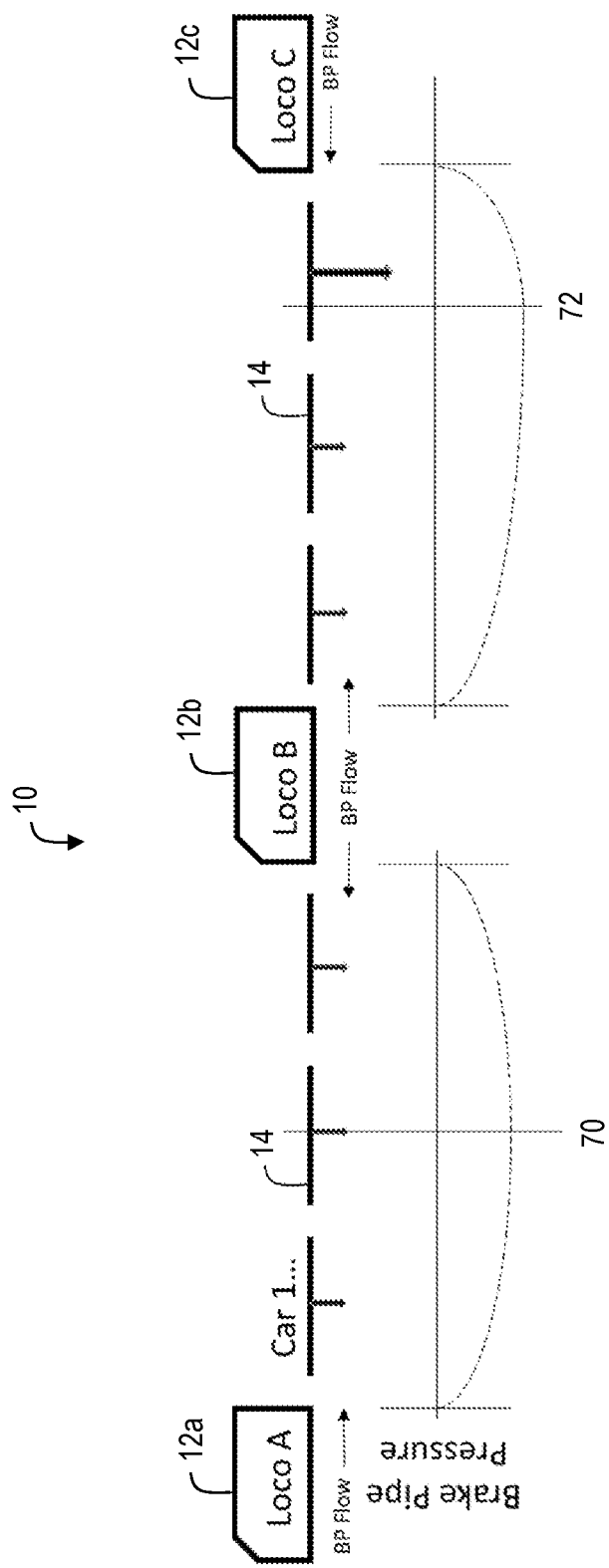
FIG. 7 is a further schematic showing a train with distributed power that includes a system according to the present invention adapted to determine the source of leakage.

Referring to FIGS. 5 through 7, for trains with distributed power, system 28 may provide an indication of the location of cars 14 having high brake pipe leakage. For train 10 with uniform leakage at each car 14 and locomotives 12a and 12b at each end of train 10 (with the remote locomotive 12b controlled by the lead locomotive 12a using a distributed power system, such Locotrol®), brake pipe charging and maintaining flow will be equal from both locomotives 12 and the minimum brake pipe pressure will be at the midpoint 70 of train 10. If, on the other hand, most of cars 14 have uniform leakage by one car 14 (or one group of cars 14) has much higher leakage, then the low BP pressure 72 along the length of train 10 will be closer to higher leakage car 14 (or group of cars 14). Thus, system 28 can provide guidance to the train crew to more quickly locate the higher leakage car 14 (or group of cars 14). For example, system 28 may be programmed to identify the low BP pressure location 72 along the length of train 10, thereby dividing train 10 into two segments separated by the low BP pressure 72 location. The leakage source will be located in the shorter of the two segments formed by low BP pressure location 72. For example, if train 10 has 100 cars 14 (car numbers 1 through 100) with a lead locomotive 12 at the head end and a remote locomotive 12 at the terminus end, and after charging the brake pipe to steady state, the minimum brake pipe pressure is found to be at car number 65, the higher leakage point is in the segment between car 65 and the remote locomotive 12. System 28 may thus instruct the train crew to inspect car number 65 to 100 for car 14 having the high leakage. System 28 may also use this approach with train 10 having multiple remote locomotive 12 as the location of abnormally low BP pressure location 72 between any two charging locomotives 12 will divide that section of train 10 into two segments of unequal length with the leakage source located in the shorter segment.

As described above, the present invention may be a system, a method, and/or a computer program associated therewith and is described herein with reference to flowcharts and block diagrams of methods and systems. The flowchart and block diagrams illustrate the architecture, functionality, and operation of possible implementations of systems, methods, and computer programs of the present invention. It should be understood that each block of the flowcharts and block diagrams can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part or all of any of the blocks in the flowcharts and block diagrams. Each block in the flowchart or block diagrams may represent a device, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:

1. A monitor for installation on a rail car, comprising:
   a pressure sensor in communication with a source of brake pipe pressure, a source of auxiliary reservoir pressure, a source of emergency reservoir pressure and a source of brake cylinder pressure; and
   a controller interconnected to the pressure sensor and configured to calculate whether a reduction of actual pressure at the source of brake pipe pressure results in an acceptable change in actual pressure at the source of brake cylinder pressure according to a predetermined threshold.

2. The monitor of claim 1, further comprising an indicator and wherein the controller is configured to provide an indication via the indicator whether the reduction of actual pressure at the source of brake pipe pressure was accompanied by the acceptable change in actual pressure at the source of brake cylinder pressure.

3. The monitor of claim 1, further comprising a communication interface interconnected to the controller and wherein the controller is programmed to output an indication of whether the reduction of actual pressure at the source of brake pipe pressure was accompanied by the acceptable change in actual pressure at the source of brake cylinder pressure via the communication interface.

4. The monitor of claim 3, wherein the indication comprises a signal sent to a remote device interconnected to the communication interface.

5. The monitor of claim 4, wherein the remote device comprises a handheld terminal interconnected to the communication interface by a wireless connection.

6. The monitor of claim 1, further comprising a control and communication device located in the cab of a locomotive and in communication with the controller.

7. The monitor of claim 6, wherein the control and communication device is configured to command a computer controlled brake of the locomotive to charge a brake pipe comprising the source of brake pipe pressure with pressure and to release a predetermined amount of pressure from the brake pipe and cause the reduction of actual pressure at the source of brake pipe pressure.

8. The monitor of claim 7, wherein the controller is programmed to communicate whether the reduction of actual pressure at the source of brake pipe pressure is accompanied by the acceptable change in actual pressure at the source of brake cylinder pressure to the control and communication device.

9. The monitor of claim 8, wherein the control and communication device is configured to provide an indication on a driver display of the locomotive whether the reduction of actual pressure at the source of brake pipe pressure is accompanied by the acceptable change in actual pressure at the source of brake cylinder pressure.

10. The monitor of claim 9, wherein the control and communication device is interconnected to a communication interface and is programmed to output the indication of whether the reduction of actual pressure at the source of brake pipe pressure was accompanied by the acceptable change in actual pressure at the source of brake cylinder pressure to a remote device via the communication interface.

11. The monitor of claim 10, wherein the remote device comprises a server programmed to track whether the reduction of actual pressure at the source of brake pipe pressure was accompanied by the acceptable change in actual pressure at the source of brake cylinder pressure for a plurality of rail cars, each of which includes the controller and the pressure sensor.

12. A method of monitoring a rail car braking system, comprising the steps of:
    providing a monitor on a rail car, wherein the monitor comprise a pressure sensor in communication with a source of brake pipe pressure, a source of auxiliary reservoir pressure, a source of emergency reservoir pressure and a source of brake cylinder pressure and a controller interconnected to the pressure sensor;
    releasing pressure in a brake pipe to cause a reduction of pressure at the source of brake pipe pressure at the rail car;
    calculating whether the reduction of actual pressure at the source of brake pipe pressure is accompanied by an acceptable change in actual pressure at the source of brake cylinder pressure of the rail car according to a predetermined threshold; and
    indicating whether the reduction of actual pressure at the source of brake pipe pressure was accompanied by the acceptable change in actual pressure at the source of brake cylinder pressure at the rail car.

13. The method of claim 12, wherein the step of indicating whether the reduction of actual pressure at the source of brake pipe pressure is accompanied by the acceptable change in actual pressure at the source of brake cylinder pressure comprises sending a signal via a communication interface.

14. The method of claim 13, further comprising the step of receiving the signal with a control and communication device located in a cab of a locomotive that is coupled to the rail car.

15. The method of claim 14, further comprising the step of receiving the signal with a handheld terminal.

* * * * *